United States Patent [19]
Devanbu

[11] Patent Number: 5,832,271
[45] Date of Patent: Nov. 3, 1998

[54] DETERMINING DYNAMIC PROPERTIES OF PROGRAMS

[75] Inventor: Premkumar Thomas Devanbu, North Plainfield, N.J.

[73] Assignee: Lucent Technologies Inc., Murray Hill, N.J.

[21] Appl. No.: 677,000

[22] Filed: Jul. 8, 1996

Related U.S. Application Data

[63] Continuation of Ser. No. 229,043, Apr. 18, 1994, abandoned.

[51] Int. Cl.[6] ........................................................ G06F 9/45
[52] U.S. Cl. .......................... 395/705; 395/180; 395/181
[58] Field of Search .................................... 395/700, 200, 395/19, 180, 181, 705

[56] References Cited

U.S. PATENT DOCUMENTS

| | | | |
|---|---|---|---|
| 4,080,650 | 3/1978 | Beckett | 364/200 |
| 4,819,234 | 4/1989 | Huber | 371/19 |
| 5,038,348 | 8/1991 | Yoda et al. | 371/19 |
| 5,301,336 | 4/1994 | Kodosky et al. | 395/800 |
| 5,313,616 | 5/1994 | Cline et al. . | |

OTHER PUBLICATIONS

"Static Analysis of Program Source Code Using EDSA", Proceeding of Conference on Software Maintenance, pp. 192–193, Oct., 1989.

Turbo Debugger, User's Guide, Version 2.5 Copyright 1988, 1991 by Borland international Ch. 7 & 8.

R. G. Hamlet, "Testing Programs with the Aid of a Compiler", IEEE Transactions on Software Engineering, vol. SE–3, No. 4, Jul. 1977.

"Man Pages for Purify", Pure Softeware Inc., Aug. 10, 1993.

P. Frankl and E. Weyuker, "A Data Flow Testing Tool", Softfair II, San Francisco, Calif., Dec. 1985.

D. J. Jablonowski, et al., "Vase: The Visualization and Application Steering Environment", *Proceedings Supercomputing 93*, Nov. 15–19, 1993, Portland US, IEEE.

J. Heymann, "A 100% Portable Inline–Debugger", *ACM Sigplan Notices*, vol. 28, No. 9, Sep. 1993, New York.

J. P. Ambras, et al., "MicroScope: An Integrated Program Analysis Toolset", *Hewlett–Packard Journal*, No. 4, Aug. 1988, Palo Alto, CA, USA, pp. 71–82.

T. Williams, "Branch Analysis Tool Quantifies Testing", *Computer Design*, vol. 29, No. 3, Feb. 1, 1990, Tulsa, US.

*Primary Examiner*—Majid A. Banankhah

[57] ABSTRACT

Techniques for obtaining information about dynamic properties of a program. The techniques involve programming a programmable execution environment such as a debugger so that when the program is executed in the execution environment, side effects of the execution provide the information about the dynamic properties. The program for the execution environment is produced by a source code analyzer which statically analyzes the source code. The source code analyzer is in turn produced by a code analyzer generator. Output from the execution environment may be provided to a graphical display system. In one use of the techniques, the code analyzer generator not only generates a source code analyzer for producing the program for the execution environment, but also a source code analyzer for producing a program which when executed by a graphical browser makes a flow graph for the program. In this case, the graphical browser responds to the output from the execution environment by altering the appearance of the flow graph.

28 Claims, 3 Drawing Sheets

FIG. 4

```
1  if (a-xp (y) == T_CONN_P) {
2     ......
3     .....
4  } else {
5  ....
6  ....
7  ...                    401
8  }
```

```
1    if (a->xp (y) == T_CONN_P) {
1.i     fprintf (log, "True Branch, if at line 1")
2       ......
3       .....
4    } else {
4.i     fprintf (log, "False Branch, if at line 1")
5    ....
6    ...
7    }                    402
8
```

FIG. 5

```
1  if (a->xp (y) == T_CONN_P) {
2     ......
3     .....
4  } else {
5  ....
6  ....
7  ...
8  }                      501
```

```
break at line 2
commands
print "log" "true branch of if at line 1"
end
break at line 5
commands
print "log" "false branch of if at line 1"
end
              502
```

FIG. 8

```
801  [
802  (?Block
803     (PRINT stdout "break %s \n commands \n delete \n continue" $location))
804  (?Switch
805     <cases
806      {Case
807       (PRINT stdout "break %s \n commands \n delete \n continue" $location)}>)]
```

DETERMINING DYNAMIC PROPERTIES OF PROGRAMS

This is a continuation of application Ser. No. 08/229,043 filed Apr. 18, 1994, now abandoned.

BACKGROUND OF THE INVENTION

1. Field of the Invention

This invention relates to software testing and verification in general and more particularly to determining dynamic properties of programs.

2. Description of the Prior Art

Introduction

When developing large programs, it is often important to have knowledge about dynamic properties: properties that can be determined only by running the program. Often, the dynamic properties involve information that is not visible during the normal operation of the program. Examples of such dynamic properties with respect to a program P and a set of inputs I for the program are:

1. When run with inputs I, does P execute all its functions?
2. When run with inputs I, does P execute all its IF-statements in both directions?
3. When run with inputs I, does it ever happen that the pointer variable aPerson, which is known be of type struct person * ever point to an object which is not of type struct person?

In order to make the above information and other information like it externally visible, the program needs to be instrumented in some way so that it produces output containing the desired information. Instrumentation can be done during the process of building the program, that is the process of compiling the source code to produce object code and linking the object code to produce executable code and can be done on the executable code itself.

One way of instrumenting a program during program build is to simply add code for the instrumentation to the source code and then compile the source code to produce the object code. The object code of course contains code corresponding to the instrumentation code which was added to the source code. Another way of doing it is to compile the source code using a special compiler which adds the necessary instrumentation to the object code. The first technique, adding instrumentation code to the source code, is very general; the kinds of instrumentation which can be added are limited only by the ingenuity of the programmer. The disadvantage, of course, is that adding the instrumentation has meant changing the source code; thus, the source code being investigated is no longer the original source code.

Using specialized compilers to produce the transformed code does not require changing the source code, but is considerably less general; only those kinds of instrumentation can be added which are provided by the particular special compiler. Other types of instrumentation require other special compilers or even modification of one of the existing special compilers. Examples of such special compilers are lcc or cc -p, available on computer systems operating under the well-known UNIX operating system (UNIX is a registered trademark of XOPEN). All of the techniques for instrumenting a program when it is built suffer from the difficulty that the building process can be very complex, and it is often difficult to ensure that the instrumented version of the program built by the build process is functionally equivalent to the version which the build process builds for customers.

There further exist tools for instrumenting the object code of a program after the program has been built. An example of such a tools is PURIFY, sold by Pure Software, Inc., 1309 S. Mary Ave., Sunnyvale, Calif., which exploits special patterns of machine code sequences and compiler code generation techniques to identify locations in the binary that are relevant to the property being investigated. The disadvantages of tools like PURIFY are that each tool permits investigation of a small fixed set of properties and that there is no portability, since a version of the tool is required for each different class of processor.

FIG. 1 provides a conceptual overview of systems of the type just described. Under normal circumstances, a system 102 of one or more programs runs with inputs 101 in an execution environment 104. Under these conditions, an internal property such as "does this system execute all functions on inputs 101" cannot be determined. To determine the internal property, we build a transformed version of the system 105, which has been instrumented to generate side effects when something happens during an execution of system 102 which is relevant to the desired property.

For instance, if one wants to find out if system 102 executes all of its functions when executed with inputs 101, one can instrument system 102 by inserting a print statement at the beginning of the source code for each function called by system 102. The instrumentation transforms system 102 into system 105. Now this transformed system 105 is run on inputs 101. Each time transformed system 105 executes a function, it executes the print statement which was inserted at the beginning of the function. The execution of the print statement is a side effect 106, and by looking at the output from the print statements, the programmer can determine which of the print statements were executed and can use that information to determine which functions were executed.

An example of how source code may be modified to determine test coverage for a given set of test inputs is shown in FIG. 4. In this case, the goal is to determine if the test has caused every if-statement to exercise both its true branch and its false branch. The original source code 401 with an if-statement (true and false branches on lines 2 and 5 respectively) is modified by inserting print statements (402) at lines 1.i and 4.i; when this modified code is executed, messages about branch executions are output to a log file and test coverage can be determined by looking at the messages in the log file.

As indicated above, all of the existing techniques for determining dynamic properties of systems have disadvantages. Instrumentation of source code requires modification of the code under test, and the instrumented source code is thus not exactly equivalent to the non-instrumented source code. Special-purpose compilers can produce instrumentation only for certain dynamic properties. Further, any instrumentation process which requires rebuilding the system being tested becomes less desirable when the program building environment becomes complex. Tools which instrument already-built executable binaries are as inflexible as the special-purpose compilers, and have the further disadvantage of lack of portability.

What is needed, and what is provided by the techniques disclosed herein is a way of investigating the dynamic properties of programs which does not involve modification of the source code of the program being tested, which can easily be adapted to test any class of dynamic property, and which is highly portable.

SUMMARY OF THE INVENTION

The techniques of the invention solve the problems of the prior art by programming a programmable execution environment to provide the desired information about the dynamic properties. The unmodified code for the program under investigation is then executed in the programmed execution environment, and the execution environment responds to the execution of the program under investigation by outputting information about the dynamic properties of interest. In a preferred embodiment, the program for the execution environment is produced by statically analyzing the source code for the program under investigation. One way of doing the static analysis is to provide a specification of the analysis to a tool which generates code analyzers. The tool then produces the code analyzer, which is in turn applied to the source code for the program under investigation to produce the program for the execution environment. Source code analyzers may be produced equally easily for many dynamic properties, and execution environments are available which have been ported to many different machines. The techniques of the invention thus not only avoid modification of the source code being tested, but may also be used to produce apparatus for testing an infinite variety of dynamic properties. Finally, the techniques may be used with any programmable execution environment and are as portable as the execution environments themselves.

The foregoing and other objects and advantages of the invention will be immediately apparent to those of ordinary skill in the art upon perusal of the following Drawing and Detailed Description.

BRIEF DESCRIPTION OF THE DRAWING

FIG. 4 shows a prior-art technique for instrumenting source code to determine the branch coverage property of a program;

FIG. 5 shows how the technique of the present invention may be employed to modify the execution environment so that it may be used to determine the branch coverage property of a program;

FIG. 8 shows a portion of the GENOA specification used to generate a static analyzer.

Figure 1:
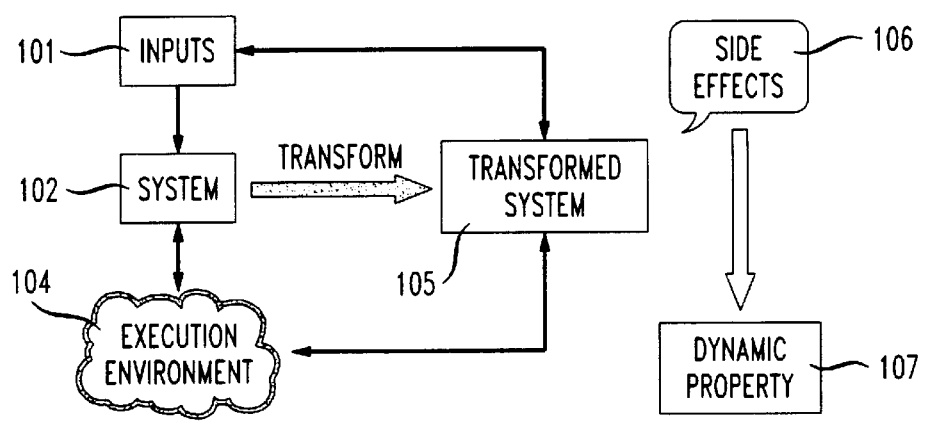
FIG. 1 is a conceptual diagram of prior-art techniques for determining dynamic properties of programs.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first present a general overview of the concept of the invention and will thereupon describe a preferred embodiment using a programmable debugger as the programmable execution environment. The Detailed Description will also disclose how static source code analyzers may be used to produce code for the programmable debugger and how such static source code analyzers may be produced using a system for generating code analyzers. Finally, an embodiment will be disclosed in which the side effects from the programmable debugger drive a graphical display of a flow graph for the program being tested.

Figure 2:
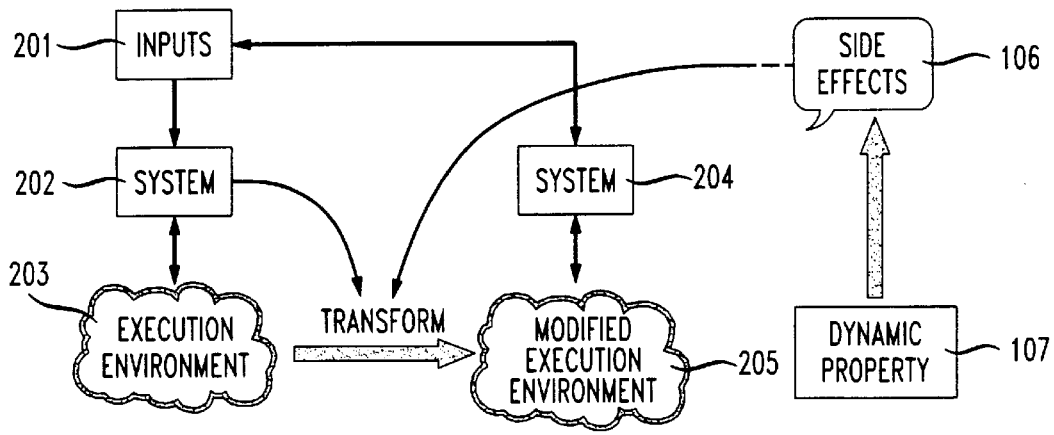
FIG. 2 is a conceptual diagram of the techniques of the present invention for determining dynamic properties of programs.

Overview of the Invention: FIG. 2

The techniques employed in the invention to investigate dynamic properties of programs are shown in overview in FIG. 2. System 202 is made up of one or more programs which are executed in a programmable execution environment 203. One example of such an execution environment is a programmable debugger. We are interested in some dynamic property 207 which system 202 exhibits when executed with inputs 201. Instead of transforming the system, as in FIG. 1, we leave system 202 unchanged, so that system 202 is identical with system 204, which is shown separately in FIG. 2 just for convenience, and instead transform execution environment 203 into another execution environment 205. How the transformation is done depends both on the system being analyzed (202≡204) and the dynamic property 207. Transformed execution environment 205 interrupts the execution of the programs of system 204 (≡202) at points that are determined by the property and the system itself, and generates side effects 206. These side effects, like the side effects 106 generated in FIG. 1, can be used to investigate property 207.

Figure 3:
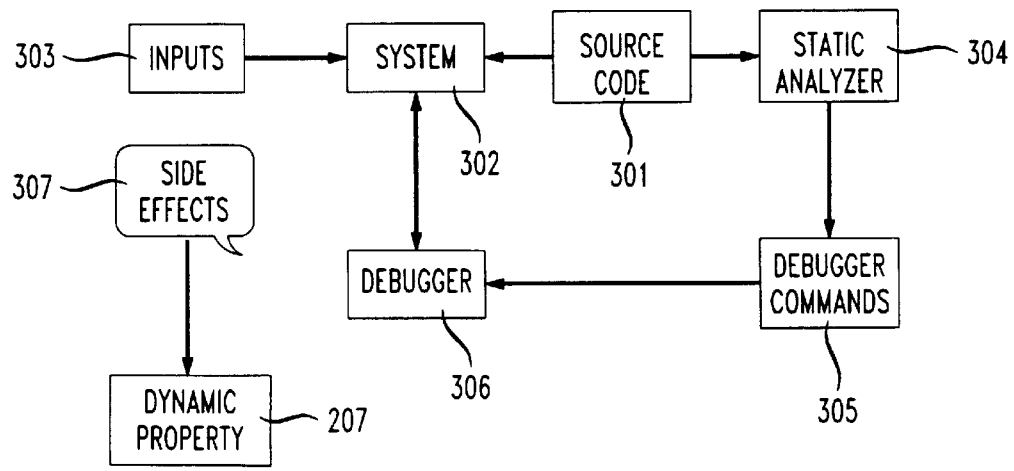
FIG. 3 is a diagram of an embodiment in which the execution environment is a debugger.

Example Embodiment: FIG. 3

FIG. 3 shows an example embodiment of how a dynamic property may be investigated by modifying an execution environment as described in the previous section. In FIG. 3, execution environment 203 is a debugger 306. Debuggers are tools used by programmers for finding bugs in programs. When a program is being debugged, it is executed in the debugger. The debugger permits the programmer to precisely control the execution of the program. A fundamental capability of debuggers is setting breakpoints. A breakpoint is a location in the program at which control passes from the program to the debugger when the program is executed in the debugger. Many debuggers are programmable, that is, the programmer can provide the debugger with a list of instructions which specify not only the locations of the breakpoints, but also actions which the debugger is to take when it encounters the break point. Actions may include halting execution until the person using the debugger restarts it or printing out the contents of machine registers and/or memory locations.

Debuggers of the type used in the present invention work with the executable binaries for a program. The programmer using the debugger specifies a location for a break point relative to the source code for the program. The debugger then finds the corresponding location in the executable binary code and replaces the instruction at that point in the executable binary with an illegal instruction. The debugger retains the replaced instruction and the action which the debugger is to take at the breakpoint.

When the program is executed and the point at which the break point was set is reached, the hardware responds to the illegal instruction with an illegal instruction event. The debugger responds to the illegal instruction event by executing the action which the programmer specified for the break point. When that has been done, the debugger replaces the illegal instruction with the retained actual instruction, executes that instruction, and passes control back to the program, which continues executing until it reaches the next breakpoint.

In the example implementation of the invention, such a debugger 306 is used to determine a specific property 308 of system 302 when run with inputs 303. First, a static analyzer 304 is created for the specific property. Static analyzer 304 is applied to source code 301 for the system and generates a sequence of commands 305 for the debugger 306. Now, the system 302 can be loaded into the debugger 306; the debugger then configures itself by executing commands 305 generated by static analyzer 304 and finally executes system 302 using inputs 303. As configured by generated commands 305, debugger 306 interrupts the execution of system 302 at specified points and creates side effects 307 (for example, writing information about the state of the program at the time of the interruption of execution into a log file). The side effects can then be analyzed for information about dynamic property 307.

A specific example of this approach in use is shown in FIG. 5. Here the application is software testing; it is desired to determine whether a set of tests is complete, that is, whether the tests have executed both the true and false branches of every if-statement. For example, in source code 501, there is an if-statement on line 1, with true- and false-branches beginning at lines 2 and 5 respectively, and the tests must execute both branches. In the preferred embodiment, static analyzer 304 is made using GENOA, a tool for generating source code analyzers. GENOA is described in Devanbu P., GENOA- A language and front-end independent source code analyzer generator, *Proceedings, Twelfth International Conference on Software Engineering,* May 1992. Static analyzer 304 produced by GENOA 710 works on a parse tree representation of source code 501 for the program.

Figure 6:
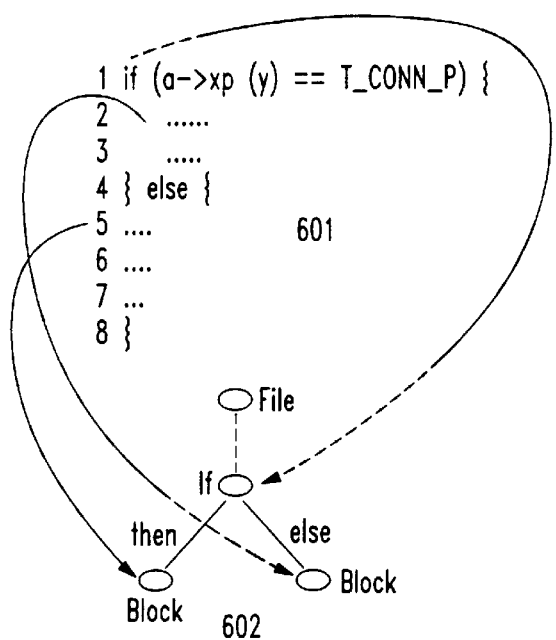
FIG. 6 shows how a static analysis of the program's parse tree is employed to generate code for the modification of the execution environment.

A parse tree is a set of labelled nodes with labelled edges connecting them. The nodes represent different parts of the parse tree. The labels on the nodes represent the type of syntactic structure represented by the node. The entire source file containing the program being analyzed is represented by the node labelled File. Somewhere below this node in the tree is the node labelled If corresponding to the If-statement 601. This portion of the parse tree appears at reference number 602 in FIG. 6. There are two edges going out of this node, lablelled then and else (shown in typewriter font) which correspond to the then- and else-parts of the If-statement 601. Each of these edges connect the If node (line 1 in 601) to Block nodes representing the blocks beginning at lines 2 and 5 in 601.

Static analyzer 304 produced by GENOA 710) traverses the parse tree looking for nodes representing If-statements. When the analyzer finds a nodes for an If-statement, it determines from the parse tree what the starting locations in the source code are for the true- and false- branches, and generates debugger commands 502 (FIG. 5) specifying those locations and actions to be taken when they are reached. When the commands are provided to debugger 306 and the system 302 built from the source 501 is executed by the debugger as configured by the commands, the debugger performs the action specified for the breakpoint at each breakpoint reached by the execution. If the actions specified for all of the breakpoints have taken place, the set of tests is complete with regard to the branches of the if statements. It should be noted here that the debugger instructions need not be produced from source 501, but can be produced as well from any available source of information about the program being tested.

As is apparent from the foregoing discussion, the technique requires no modification of the source code. The modifications of the executable binary produced by the debugger are temporary and do not involve the addition of instructions to the executable binary. When the debugger is one which is available on many platforms, one gains the convenience of binary instrumentation without sacrificing portability. An example of such a debugger is gdb, described in Stallman, R., and Pesch, R., Debugging with GDB, available by Internet file transfer from prep.mit.edu).

Figure 7:
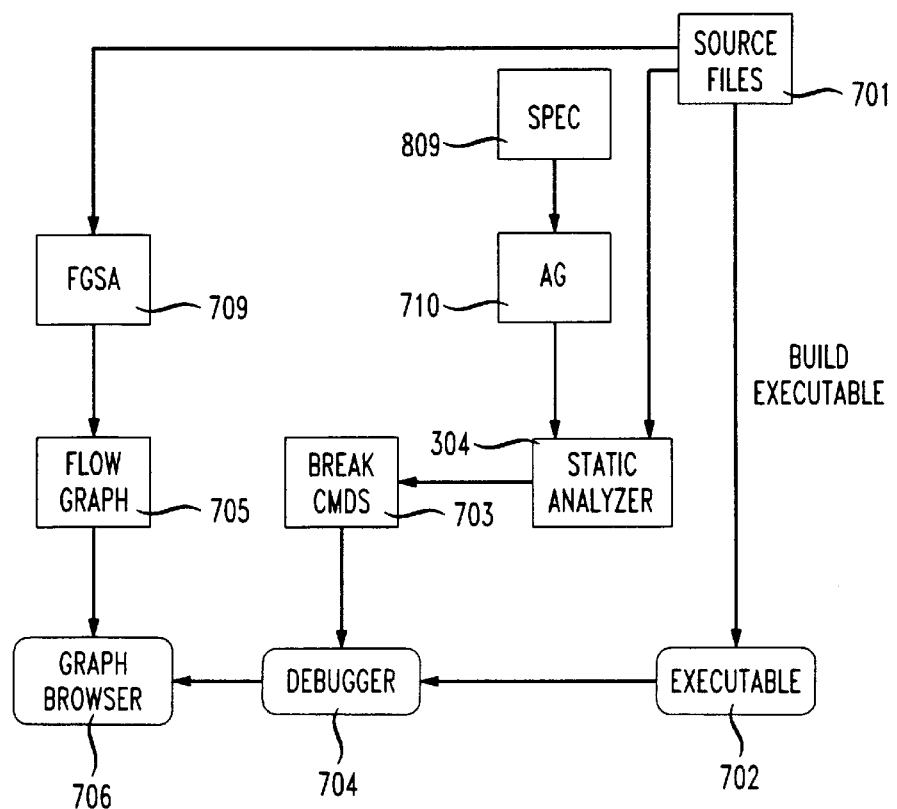
FIG. 7 shows how output from the execution environment may be applied to a graph browsing program to produce a dynamic graphical representation of the results of a test of a program.

Coupling the Dynamic Property Analyzer to a Graphical Display: FIG. 7

The side effects 307 produced by debugger 306 may of course be provided to any kind of device which produces output which is useful for analyzing the dynamic property. For example, in FIG. 7, the side effects 307 are used to animate a flow graph 705. Flow graph 705 is produced in this example using another static analyzer 709 made with GENOA. Flow graph 705 is provided to graphical browser 706 for visual display. Then, we analyze the source code to produce commands 703 for a debugger 704 as described above. The commands set break points at beginnings of blocks etc; each time a break point is activated, the debugger responds as specified by the commands. In this case, the commands specify that an inter-process message 708 specifying a modification in the visual display of the flow graph be sent from the process in which debugger 704 is executing to the process in which graphical browser 706 is executing. In response to the message, graphical browser 706 modifies the visual display. This technique can be used for visual display of test coverage information or simply as an aid to program comprehension and debugging.

Using GENOA to make a static analyzer: FIG. 8

A portion of a specification 809 used with GENOA 710 to produce a static analyzer 304 are shown in FIG. 8. The static analyzer which GENOA produces from the specification 809 performs a search of the entire program for blocks and switch statements. The search is specified by the square brackets at line 801 and the end of line 807. What is being searched for is specified at line 802 (for the blocks) and line 804 (for the switch statements). Line 803 specifies that break points are to be set at the beginning of the block and that debugger commands are to be generated for each break point which instruct the debugger to delete the breakpoint and continue. For switch statements, breakpoints are set at each case of the switch (line 807) and the same debugger commands are to be generated. Since each breakpoint is deleted when activated, the breakpoints remaining after a test run indicate the parts of the code that have not been executed. The programmable debugger employed in the preferred embodiment indicates to the user which break points have not been executed, and thus indicates which parts of the code have not been executed. For more details on GENOA 710 and the language it uses to specify static code analyzers, see Devanbu P., GENOA- A language and front-end independent source code analyzer generator, *Proceedings, Twelfth International Conference on Software Engineering,* May 1992).

As is apparent from FIG. 8, the use of a static source code analyzer generator such as GENOA greatly simplifies the implementation of static analyzers 304. When a tool such as GENOA is used together with a programmable and portable debugger such as gdb, one can easily implement devices to determine a wide range of dynamic properties on a wide range of hardware.

Conclusion

The foregoing Detailed Description has disclosed to those skilled in the art the best mode presently known to the inventor of practicing his techniques for determining dynamic properties of a program without modifying the source code. Instead, the techniques produce a modified execution environment. When the program is executed in the modified execution environment, side effects are produced which permit study of a given dynamic property. Particular advantages of these techniques arise from the following features:

the execution environment is easily programmable;
the program for the execution environment may be produced by applying a static source code analyzer to the source code of the program being studied;
the execution environment operates in many different machine environments; and
the static source code analyzer may be produced using a source code analyzer generator.

In the preferred embodiment, the execution environment is a debugger; however, the principles of the invention may be employed with any programmable execution environment. Moreover, while the preferred embodiment employs a static analysis of the source code to produce the instructions for the programmable execution environment, any kind of analysis which produced such instructions could be used instead. Finally, it is particularly advantageous to use a system such as GENOA to produce the static analyzer, but the analyzer could be produced in any way, including by hand. Having understood the principles of the techniques disclosed herein, those skilled in the art will be able to produce systems which employ the principles of the invention, but differ in every other respect from the embodiments disclosed herein.

That being the case, the Detailed Description is to be understood as being in all respects illustrative and exemplary, but not restrictive, and the scope of the invention is not to be defined by the Detailed Description, but rather by the claims as interpreted with the full breadth permitted by the law.

What is claimed is:

1. Apparatus which is implemented using a computer system, the apparatus being used to obtain first information about a dynamic property of a first executable program accessible to the computer system and the apparatus comprising:

static analysis means for performing a static analysis of second information about the first program and producing a second program therefrom, the second information being accessible to the computer system and the static analysis means executing in the computer system; and programmable execution environment means for executing the first program under control of the second program, the programmable execution environment means executing in the computer system and the second program causing the programmable execution environment means to output the first information while executing the first program.

2. An apparatus for determining information concerning the dynamic properties of a computer program comprising:

means for performing a static analysis of said computer program;

means for producing an analysis program in response to said static analysis; and means for executing said computer program under the control of said analysis program to provide information concerning said dynamic properties of said computer program.

3. The apparatus according to claim 2 wherein said means for performing a static analysis includes:

means for generating a code analyzer; and means for providing a specification of said static analysis.

4. The apparatus according to claim 3 wherein said means for performing a static analysis also includes:

means for receiving the source code of said computer program.

5. The apparatus according to claim 4 wherein said means for producing an analysis program includes:

means for applying said generated code analyzer to said source code.

6. The apparatus according to claim 2 wherein said means for executing includes a programmable execution environment.

7. The apparatus according to claim 6 wherein said programmable execution environment includes a programmable debugger.

8. The apparatus according to claim 2 also including:

display means for displaying said information concerning said dynamic properties of said computer program.

9. The apparatus according to claim 8 wherein said means for performing a static analysis includes:

means for generating a code analyzer; and means for providing a specification of said static analysis.

10. The apparatus according to claim 9 wherein said means for performing a static analysis also includes:

means for receiving the source code of said computer program.

11. The apparatus according to claim 10 wherein said means for producing an analysis program includes:

means for applying said generated code analyzer to said source code.

12. The apparatus according to claim 9 wherein said means for executing includes a programmable execution environment.

13. The apparatus according to claim 12 wherein said programmable execution environment includes a programmable debugger.

14. A method for determining information concerning the dynamic properties of a computer program without modifying the source code of the computer program comprising the steps of:

performing a static analysis of said computer program;

producing an analysis program in response to said static analysis; and executing said computer program under the control of said analysis program to determine information concerning said dynamic properties of said computer program, said dynamic properties being properties that can only be determined when said computer program is executed.

15. The method according to claim 14 wherein said step of performing a static analysis includes the steps of:

generating a code analyzer; and providing a specification of said static analysis.

16. The method according to claim 15 wherein said step of performing a static analysis also includes the step of:

receiving the source code of said computer program.

17. The method according to claim 16 wherein said step of producing an analysis program includes the step of:

applying said generated code analyzer to said source code of said computer program.

18. The method according to claim 14 wherein said step of executing said computer program includes the step of using a programmable execution environment.

19. The method according to claim 18 wherein said step of using a programmable execution environment includes the step of providing a programmable debugger.

20. The method according to claim 14 also including the step of:
    displaying said information concerning said dynamic properties of said computer program.

21. A method for determining information concerning the dynamic properties, properties only determinable during execution, of a computer program without modifying the source code of the computer program comprising the steps of:
    performing a static analysis of said computer program by generating a code analyzer, providing a specification of said static analysis and receiving the source code of said computer program;
    producing an analysis program in response to said static analysis by applying said generated code analyzer to said source code;
    executing said computer program under the control of said analysis program to determine information concerning said dynamic properties of said computer program by using a programmable execution environment; and
    displaying said information concerning said dynamic properties of said computer program.

22. An apparatus for determining information concerning properties of a computer program that can only be determined while the computer program is being executed comprising:
    means for performing a static analysis of said computer program;
    means for producing an analysis program in response to said static analysis; and
    means for executing said computer program under the control of said analysis program to provide information concerning said properties of said computer program.

23. The apparatus according to claim 22 wherein said means for performing a static analysis includes:
    means for generating a code analyzer; and
    means for providing a specification of said static analysis.

24. The apparatus according to claim 23 wherein said means for performing a static analysis also includes:
    means for receiving the source code of said computer program.

25. The apparatus according to claim 24 wherein said means for producing an analysis program includes:
    means for applying said generated code analyzer to said source code without modifying said source code.

26. The apparatus according to claim 22 wherein said means for executing includes a programmable execution environment.

27. The apparatus according to claim 26 wherein said programmable execution environment includes a programmable debugger.

28. The apparatus according to claim 22 also including:
    display means for displaying said information concerning said properties of said computer program.

\* \* \* \* \*